Dec. 22, 1953

B. M. OLIVER 2,663,830

SEMICONDUCTOR SIGNAL TRANSLATING DEVICE

Filed Oct. 22, 1952

INVENTOR
B. M. OLIVER

BY [signature]

ATTORNEY

Patented Dec. 22, 1953

2,663,830

UNITED STATES PATENT OFFICE 2,663,830

SEMICONDUCTOR SIGNAL TRANSLATING DEVICE

Bernard M. Oliver, Palo Alto, Calif., assignor to Bell Telephone Laboratories, Incorporated, New York, N. Y., a corporation of New York Application October 22, 1952, Serial No. 316,155

4 Claims. (Cl. 317—235)

This invention relates to semiconductor signal translating devices and more particularly to such devices of the type known as junction transistors.

Such transistors, which are disclosed in Patent 2,569,347, granted September 25, 1951 to W. Shockley and are discussed in detail by R. L. Wallace and W. J. Pietenpol in the Bell System Technical Journal, volume 30, July 1951, page 530, comprise a body of semiconductive material, for example germanium or silicon, having therein a zone of one conductivity type, that is N or P type, between and contiguous with a pair of zones of the opposite conductivity type. A base connection is made to the intermediate zone and emitter and collector connections are made to the outer zones respectively.

As disclosed in the application Serial No. 286,914, filed May 9, 1952 of S. Darlington, two or more transistors can be cooperatively associated to constitute in effect a single transistor having advantageous performance characteristics better than or distinct from those attainable with any of the individual units. For example, in one construction, the collectors of the two units are tied together directly and the base of one is connected directly to the emitter of the other, thereby to define an equivalent transistor having a current multiplication factor, commonly designated $\alpha$, greater than that of either of the component units. Such devices may be referred to conveniently as compound transistors.

It has been found that although for such devices advantageous operating characteristics are realizable, the collector current for zero emitter current, commonly designated $I_{co}$, for the equivalent transistor is larger than that for any component unit. Such collector current and as it appears in the base is undesirable in a number of applications.

One general object of this invention is to improve performance characteristics of compound transistors. More specifically, one object of this invention is to reduce the collector current for zero emitter current for such devices.

In accordance with one feature of this invention, in an equivalent transistor comprised of two or more junction units, the units are made of sizes in accordance with a prescribed ratio whereby the collector current above noted is substantially reduced and the current densities in the units are substantially equal.

In one specific embodiment of this invention, a translating device comprising a body of semiconductive material of NPN, or PNP, configuration is provided with slots dividing it into two or more junction transistor units having a common collector region or zone, individual base and emitter regions or zones and substantially equal current multiplication factors. The slots are related such that the transverse areas of the units are in the ratio $1:(1-\alpha)$. The emitter connection is made to the emitter zone of the largest unit and the base connection to the base of the smallest unit.

The invention and the above noted and other features thereof will be understood more clearly and fully from the following detailed description with reference to the accompanying drawing, in which.

Figure 1:
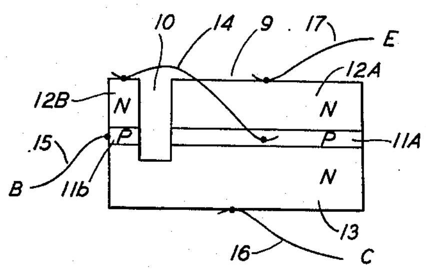
Fig. 1 is an elevational view of a semiconductor signal translating device illustrative of one embodiment of this invention.
Figures 2, 3:
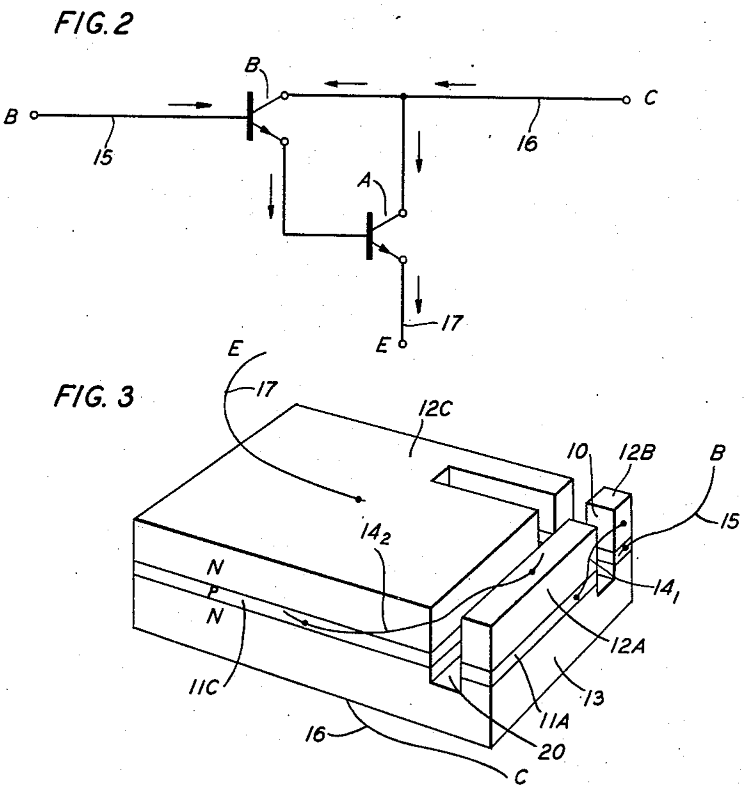
Fig. 2 is a circuit analog of the device shown in Fig. 1.
Fig. 3 depicts in perspective another illustrative embodiment of this invention wherein the compound transistor is constituted of three units.

Referring now to the drawing, the compound transistor illustrated in Figs. 1 and 2 comprises a body or wafer 9 of semiconductive material, for example germanium, of NPN sandwich configuration, as indicated by the conductivity type designating letters N and P in Fig. 1. Advantageously, the block or wafer is of single crystal construction fabricated, for example, in the manner disclosed in the application Serial No. 168,184 filed June 15, 1950 of G. K. Teal. As shown in Fig. 1, the body or wafer is provided with a slot or groove 10 which extends through one of the outer, or N, zones and the intermediate, or P, zone. Thus, the wafer is divided, in effect, into two junction transistor units of NPN configuration, one unit comprising the P type base zone 11A, the N type emitter zone 12A and the N type collector zone 13, and the other unit comprising the P type base zone 11B, the N type emitter zone 12B and the N type collector zone 13.

The emitter zone 12B of one unit is connected directly to the base zone 11A of the other by a conductor 14 making substantially ohmic connections to these zones. Ohmic connections are made to the zones 11B, 13 and 12A by wires 15, 16 and 17 respectively, these constituting respectively the base, collector and emitter connections or terminals of the compound transistor, as indicated by the letters B, C and E in Figs. 1 and 2. In operation of the device as an amplifier, as disclosed more fully in the application of S. Darlington identified hereinabove, input signals are applied between the emitter and base terminals 17 and 15 and the load circuit is connected between the base and collector terminals 15 and 16. As also set forth in that application, the effective current multiplication factor, $\alpha$, for the compound transistor is greater than that of either of the units A or B. It can be expressed mathematically as $$\alpha=1-(1-\alpha_B)(1-\alpha_A)$$

where $\alpha_A$ and $\alpha_B$ are the current multiplication factors of the units A and B respectively. Thus, for example, if $\alpha_A=\alpha_B=0.9$, then $\alpha=0.99$.

However, the collector current, $I_{c0}$, for zero emitter current of the compound transistor is larger than that for either of the component units. This will be appreciated from brief analysis. Consider unit B for the condition of zero emitter current for this unit. The collector current will be $I_{c0_B}$ which flows into the collector and out of the base of this unit. Since the base current for unit A is zero, the emitter and collector currents for unit A will be $$\frac{I_{c0_A}}{1-\alpha_A}$$

Thus the total current at collector 16 will be $$I_{c0_B}+\frac{I_{c0_A}}{1-\alpha_A}$$

In a variety of applications, such current is decidedly disadvantageous providing, for example, a power loss and a relatively high threshold.

In accordance with one feature of this invention, the collector current for the compound transistor, for zero emitter current, is substantially minimized. Specifically, in accordance with this feature, the cross sectional areas, i. e., the areas in planes parallel to the NP junctions, of the component units are made in the ratio $1:(1-\alpha_A)$, the base connection 15 being made to the smaller unit. It has been found that the current $I_{c0}$ for a transistor unit is a function of the area noted, increasing substantially linearly with increasing area. Thus, when the areas of the two units are made in the ratio indicated, the effective collector current $I_{c0}$ for the compound transistor is a minimum. Also, it will be noted, the current density, i. e., current per unit cross sectional area, is the same for the two units. Further, because of the smaller area of the unit to which the base connection 17 is made, the collector resistance for this unit is increased whereby the reaction of output on input of the compound transistor is reduced.

Figure 4:
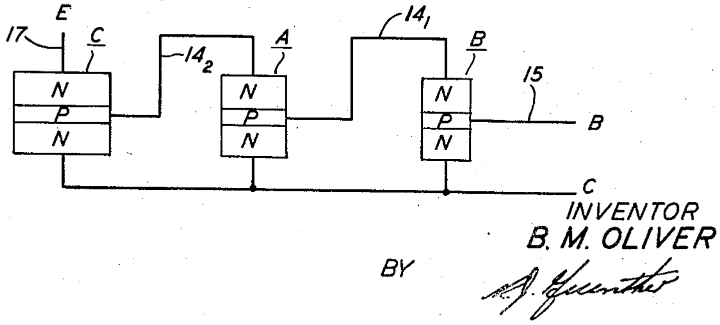
Fig. 4 portrays diagrammatically the electrical association of the units in the transistor shown in Fig. 3.

The invention may be embodied also in compound transistors having more than two component units, for example three as illustrated in Figs. 3 and 4. The semiconductor, e. g. germanium, body is divided into three NPN transistor units by the slots or grooves 10 and 20, the units having a common collector zone 13 and individual emitter and base zones identified in Fig. 3 by the numerals 12 and 11 respectively plus the letters A, B and C indicative of the unit. The emitter of unit B is tied directly to the base of unit A by conductor $14_1$ and the emitter of unit A is tied similarly to the base of unit C by conductor $14_2$. The base connection for the compound transistor is made to unit B and the emitter connection to unit C as depicted in Fig. 4. The slots 10 and 20 are made such that the areas of the three units are in the ratio $1:(1-\alpha_A):(1-\alpha_A)(1-\alpha_C)$ whereby the effective $I_{c0}$ for the compound transistor is minimized. Where, as is usually the case for unitary semiconductor bodies, the current multiplication factor $\alpha$ is the same for the three units, the ratio noted is, of course, $1:(1-\alpha):(1-\alpha)^2$.

Although the invention has been described with particular reference to transistors of NPN configuration, it will be understood, of course, that it may be embodied also in devices of PNP configuration. Also, although it has been described with particular reference to compound transistors wherein the component units are parts of a unitary semiconductive body, the invention may be embodied also in compound transistors composed of physically separate units. Further, various modifications may be made in the specific structures shown and described without departing from the scope and spirit of this invention.

What is claimed is:

1. A signal translating device comprising a plurality of junction transistor units each having emitter, base and collector regions, said units being of progressively greater cross sectional areas, means connecting the base region of each but the smallest unit to the emitter region of the next smaller unit, means connecting the collector regions of all said units together, a base connection to the base region of the smallest unit, and an emitter connection to the emitter region of the largest unit.

2. A signal translating device comprising a plurality of junction transistor units having an electrically common collector and individual base and emitter regions, said units being of cross sectional areas progressively increasing in the ratio $1:(1-\alpha)$, where $\alpha$ is the current multiplication factor of one of the units, means directly connecting the emitter region of each but the largest unit to the base region of the next larger unit, and base and emitter connections respectively to the base region of the smallest unit and the emitter region of the largest unit.

3. A signal translating device comprising a body of semiconductive material having therein an intermediate zone of one conductivity type between and contiguous with a pair of outer zones of the opposite conductivity type, said body having therein a groove extending through said intermediate zone and one of said outer zones, thereby to define two junction transistor units for which the other of said outer zones constitutes a common collector region and the portions of said intermediate and one outer zone on opposite sides of said groove constitute base and emitter regions respectively, said groove being positioned so that the transverse areas of said units are substantially in the ratio $1:(1-\alpha)$, where $\alpha$ is the current multiplication factor of the larger unit, means connecting the emitter region of the smaller unit to the base region of the larger unit, a connection to the base region of the smaller unit, and a connection to the emitter region of the larger unit.

4. A signal translating device comprising a body of semiconductive material having therein an intermediate zone of one conductivity type between and contiguous with a pair of outer zones of the opposite conductivity type, said body having therein a pair of intersecting slots both extending through one of said outer zones and said intermediate zone whereby said body defines three junction transistor units for which the other outer zone constitutes a common outer region and the section of said intermediate and one outer zone constitute the other regions, said slots being positioned so that the transverse areas of said units are of progressively increasing magnitude in the relation of substantially 1:(1—$\alpha$), where $\alpha$ is the current multiplication factor of one of said units, means directly connecting the intermediate region of the two larger units each to the section of said one outer zone corresponding to the next smaller unit, a connection to the intermediate region of the smallest unit, and a connection to the section of said one outer zone corresponding to the largest unit.

BERNARD M. OLIVER.

References Cited in the file of this patent

UNITED STATES PATENTS

| Number | Name | Date |
|---|---|---|
| 2,402,661 | Ohl | June 25, 1946 |
| 2,595,497 | Webster | May 6, 1952 |
| 2,629,672 | Sparks | Feb. 24, 1953 |